Nov. 17, 1970 B. N. NAYDAN ET AL 3,541,315

ANALOG-TO-DIGITAL CYCLIC FORWARD FEED CONVERSION EQUIPMENT

Filed April 13, 1967 3 Sheets-Sheet 1

INVENTORS
BOB N. NAYDAN
JOHN BRINKMAN

BY

ATTORNEY

INVENTORS
BOB N. NAYDAN
JOHN BRINKMAN
BY
George B. Oujevolk
ATTORNEY

ANALOG-TO-DIGITAL CYCLIC FORWARD FEED CONVERSION EQUIPMENT

Filed April 13, 1967

3 Sheets-Sheet 3

INVENTORS
BOB N. NAYDAN
JOHN BRINKMAN

BY George B. Oujevolk

ATTORNEY

United States Patent Office 3,541,315

Patented Nov. 17, 1970

3,541,315

ANALOG-TO-DIGITAL CYCLIC FORWARD FEED CONVERSION EQUIPMENT

Bob N. Naydan, Oakland, and John Brinkman, Pine Brook, N.J., assignors to Singer-General Precision, Inc., Little Falls, N.J., a corporation of Delaware Filed Apr. 13, 1967, Ser. No. 630,678

Int. Cl. H03k *13/17*

U.S. Cl. 235—154 8 Claims

ABSTRACT OF THE DISCLOSURE

An analog value to be converted to a digital count in an analog-to-digital converter of limited capabilities is first converted into a digital number by applying the analog signal to a converter which converts the signal into digital form and transfers this digital number to a register. The value of the number in the register is reconverted back to analog form by a summing network and subtracted from the original analog signal. The difference between the original and the reconverted values is then amplified by a proper scale factor and converted to obtain a second digital number. The most significant bits of the second digital number are then compared with the corresponding bits of the first number by logic means and the two numbers are then properly consolidated by additional logic means into a final output register in form suitable for use by external equipment.

BRIEF SUMMARY OF THE INVENTION

The present invention relates to the conversion of an analog value to a binary digital value, and more particularly to a system for accomplishing this to a high degree of accuracy when using only very coarse conversion equipment.

To better explain the operation of the system contemplated herein, a simple explanation will first be given. Assume that it is desired to convert an analog value to an eight-place binary value but only a crude converter is available. The analog value can be first converted to a five-place first coarse digital value using the crude converter set at a low scale factor. The digital value so obtained can then be converted back to an analog value, and compared with the true analog value. The difference between the two analog values can again be converted to a five-place second digital value, but using a higher scale factor. The two digital values so obtained can then be used to obtain an eight-place value. A simple illustration will make the explanation clearer.

EXAMPLE I

It is desired to convert an analog voltage having a value of 101 volts, to a value in the digital system.

| Binary value: | Scale factor [1] |
|---|---|
| $2^7$ (MSB) | 128 |
| $2^6$ | 64 |
| $2^5$ | 32 |
| $2^4$ | 16 |
| $2^3$ | 8 |
| $2^2$ | 4 |
| $2^1$ | 2 |
| $2^0$ | 1 |

[1] Equivalent weight in volts.

Assuming that use is made of a converter which has only five-place precision, say the answer (including resolution and other errors) is 128 volts, or its binary equivalent 10000*xxx*. This value so obtained is converted back to analog form, compared with the input, and in this case subtracted from the input to obtain an analog difference value of −27 volts. By converting this difference voltage, using the same five-place converter, but with an appropriately higher scale factor, the answer obtained is −*xxx*11011. This second value may be then combined with the first value as follows:

| | | |
|---|---|---|
| First binary value | 10000xxx | |
| Second binary value | −xxx11011 | (logic requires |
| Final corrected Binary value | 01100101 | subtraction) |

Note the final corrected binary value represents the correct answer, 101 volts.

EXAMPLE II

It is desired to convert an analog value having a weight of 77 volts to a value in the binary system as explained hereinbefore.

A first conversion is made using the first scale factor of Example I and the following coarse binary value is obtained:

01000*xxx*.—This value is reconverted back to an analog value and yields a weight of 64 volts, which is a difference of 13 volts from the original value of 77 volts. This difference of 13 volts is again converted into binary form using the converter with an appropriately raised scale factor yielding: *xxx*01101. The two values thus obtained are then compared as follows:

01000xxx
xxx01101 (logic requires addition)
01001101 = Binary equivalent of 77 volts

FUNCTIONAL DESCRIPTION

Figure 1:
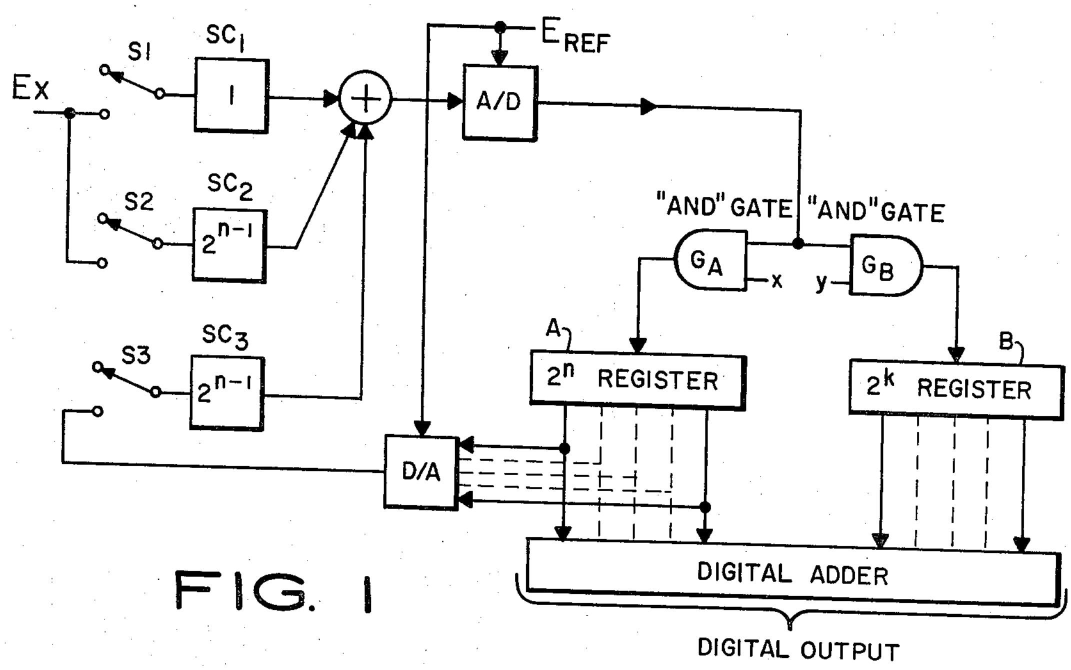
FIG. 1 is a block diagram of an explanation of the invention concept.

A system using the foregoing technique appears in FIG. 1, wherein an analog value $E_x$ is fed to a converter which will convert the analog value $E_x$ into a binary value of "*n*" bits. Each of switches S1, S2 and S3 leads into a scale factor change means $SC_1$, $SC_2$ and $SC_3$ which will respectively change the scale factors to "1"; "$2^{n-1}$"; and "$2^{n-1}$" ("*n*" being the number of bits). The scale factor change means $SC_1$ to $SC_3$ provide an output to an adder "+" which in turn provides an output to an analog to digital converter A/D which provides a digital output in binary form to register "A" or register "B" depending on the signal at AND gates $G_A$ and $G_B$. These registers can store $2^n$ bits.

The first step in obtaining a converted output is to apply the signal into analog-to-digital converter A/D by closing switch $S_1$. The answer for this first conversion is stored in register A. This first coarse value "A" in register A is converted back to Analog form by means of digital-to-analog converter D/A.

The second step in obtaining a converted output is to apply both the signal and the converted analog value "A" into analog-to-digital converter A/D by closing switches $S_2$ and $S_3$ and opening switch $S_1$. Note that both the signal $E_x$ and the converted analog value "A" are fed through the appropriate scale factor means $SC_2$ and $SC_3$ into adder "+," which combines them to form a difference signal. It is the difference signal, thus obtained, which is applied to analog-to-digital converter A/D. The answer of this second conversion is stored in register B.

The coarse value "A" in register A is converted back into analog form by means of digital-to-analog converter D/A and scale factor change means $SC_3$ having a scale factor of $2^{n-1}$. The analog input $E_x$ is also fed to scale factor change means $SC_2$ and the outputs of $SC_2$ and $SC_3$ can be added in adder "+."

EXAMPLE III

Assume an unknown analog signal is applied $E_x$. It is required to produce a digital output corresponding to the unknown voltage.

Step 1.—$S_1$ is closed, $S_2$ and $S_3$ open.

Step 2.—The unknown $E_x$ is converted in the analog-to-digital converter to yield a digital output "A" at a scale factor related to $E_{ref}$. Then $A \cdot E_{ref} - E_x$=error If the error in the converter A/D is stated as some plus or minus multiple of the least resolution bit termed for convenience as $\pm M_1$; $M_1$ could take any value such that:

$$A \cdot E_{ref.} - E_x = \pm \frac{M_1 \cdot E_{ref.}}{2^n}$$

then:

$$A = \frac{E_x}{E_{ref.}} \pm \frac{M_1}{2^n}$$

Step 3.—"A," the digital quantity, is applied to the digital-to-analog converter D/A producing an analog quantity $$-\left(A \cdot E_{ref.} \pm \frac{N_1}{2^n} E_{ref.}\right) = -E_{ref.}\left(A \pm \frac{N_1}{2^n}\right)$$

where $N_1$ is the analog error of the converter D/A.

Step 4.—$S_1$ open, $S_2$ and $S_3$ closed.

Step 5.—The output of converter D/A scaled by $(2^{n-1})$ and the input unknown $E_x$ also scaled by $(2^{n-1})$ are summed by added "+" and applied to the converter A/D.

This yields a value "B" similar to that obtained in Step 2.

$$B = \frac{\left[E_x - E_{ref.}\left(A \pm \frac{N_1}{2^n}\right)\right](2^{n-1})}{E_{ref.}} + \frac{\text{Error}}{E_{ref.}}$$

Since the same converter A/D is used, the error is $$\pm \frac{M_1 E_{ref.}}{2^n}$$

then $$B = \left[\frac{E_x}{E_{ref.}} - A \pm \frac{N_1}{2^n}\right](2^{n-1}) \pm \frac{M_1}{2^n}$$

Step 6.—The digital quantity "A" is now added to the digital quantity $$B/2^{(n-1)}$$

The total digital output "C" is:

$$C = \frac{E_x}{E_{ref.}} \pm \frac{N_1}{2^n} \pm \frac{M_1}{2^n(2^{n-1})}$$

EXAMPLE IV

Following the steps of the previous example, but giving values to the parameters, let $N_1=0$, $n=5$, $M_1=1$.

$$\text{Digital Output "}C\text{"} = \frac{E_x}{E_{ref.}} \pm \frac{1}{2^5(2^5-1)}$$

$$= \frac{E_x}{E_{ref.}} \pm \frac{1}{2^9}$$

$$= \frac{E_x}{E_{ref.}} \pm \frac{1}{512}$$

Therefore, with an A/D converter which has an accuracy of $$\frac{1}{2^n} = \frac{1}{32}$$

or approximately 3%, a conversion is accomplished to an accuracy of approximately 0.2%.

Figure 2:
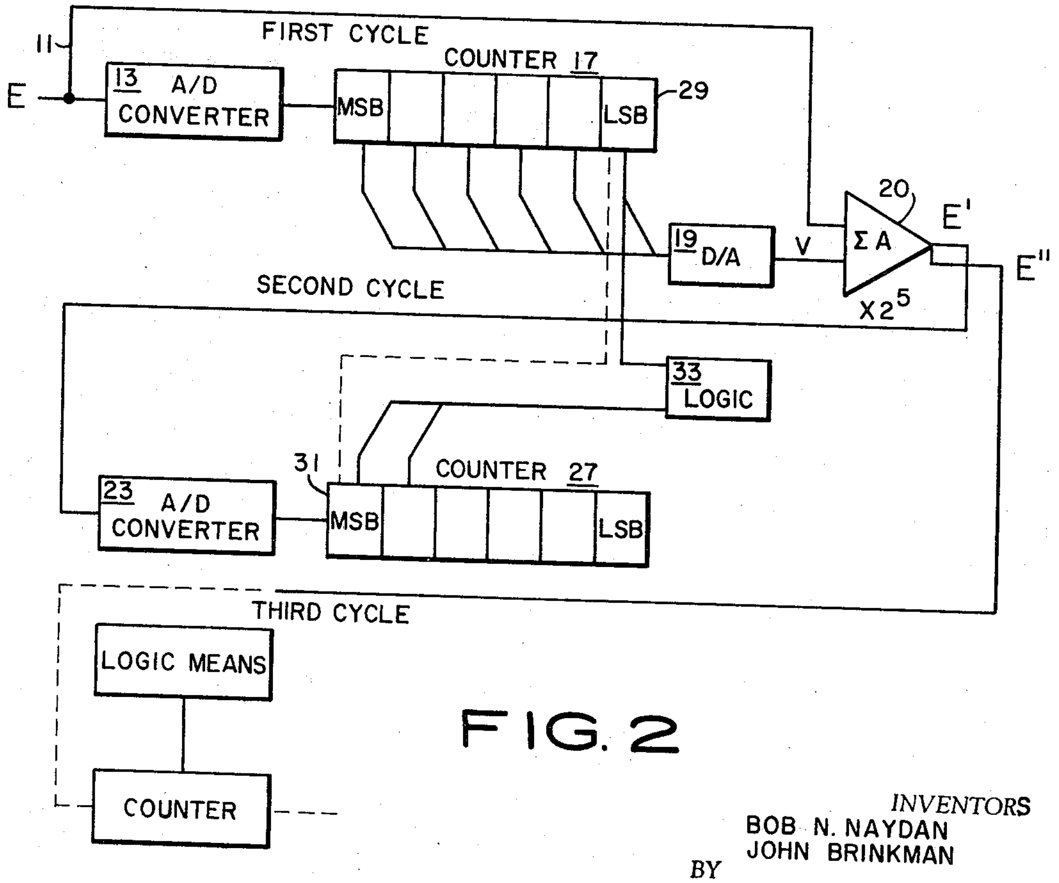
FIG. 2 is a simplified block diagram of a specific implementation of the invention; and, FIGS. 3*a*, 3*b* are schematic circuit drawings of an embodiment used in practice.
Figure 3A:
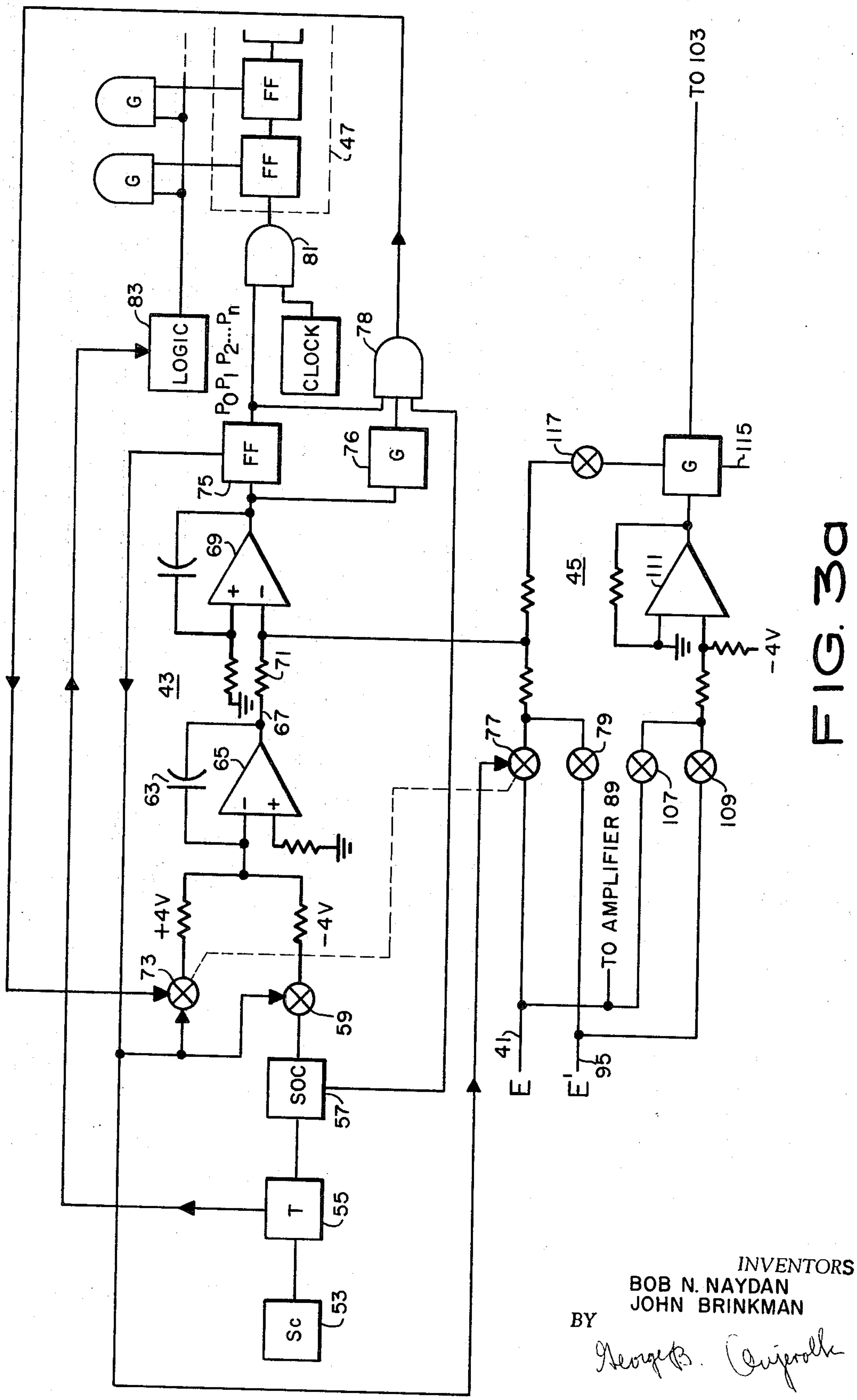
Figure 3B:
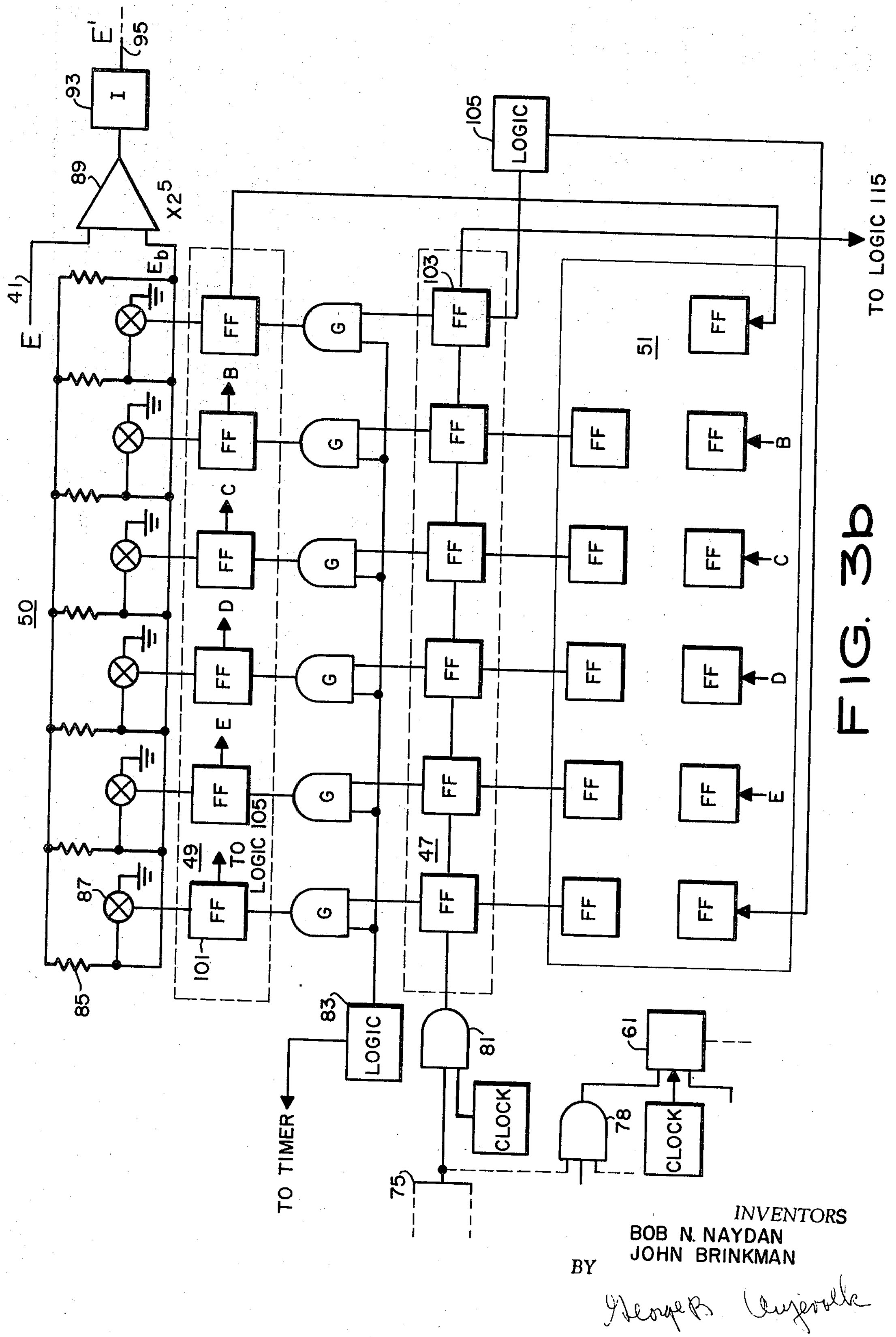

Applying the system just described to the embodiment shown in FIG. 2 an input signal having a weight of E is applied over line 11 to an analog-to-digital converter 13. Converter 13 may be either a ladder network converter, similar to that shown in the G. Schroeder et al. U.S. Pat. No. 3,071,324 (except that the type of ladder used is much simpler since the conversion is a "straight-line" conversion); or, the converter may be a ramp converter having an integrator amplifier and a comparator amplifier. Assuming that the A/D converter used is a ramp converter, converter 13 will form a series of pulses acting on counter 17. The contents of this counter are transferred, at the end of the first A/D conversion, to digital input of digital-to-analog converter 19. Digital-to-analog converter contains a summing amplifier 20 which adds the digital-to-analog converter output V to the input signal E, fed in by line 11. The digital-to-analog converter summing amplifier 20 also provides a scale factor of $2^5$, i.e. it has a gain of 32. The output of amplifier 20, denominated E' [where $E' = (E-V) \times 32$], is then fed into a second analog-to-digital converter 23, which may be the same as, similar to, or different from converter 13. The output of converter 23 is fed to counter 27. Both counters 17 and 27 are six-bit registers. Counter 17 provides the coarse value while counter 27 provides the fine value. Due to the difference in scale factor of $2^5$, the two sets of counters have one common bit, i.e., least significant bit 29 of registers 17 correspond to the most significant bit 31 of register 27. The coarse and fine values in these registers are combined by adding the contents of counter 27 to counter 17. The information contained in LSB 29 and LSB 31 is used by logic 33 to generate a "carry," as required. The resultant output will be an 11-bit binary number consisting of the contents of counter 27, not including the MSB 31, and the contents of counter 29 as modified by logic 33. The MSB of the output will correspond to the MSB of counter 17, the LSB of the output will correspond to the LSB of counter 27.

Thus, in the first cycle, a coarse binary value is obtained, in the second cycle, a fine value is obtained. It is possible to repeat this cycle and again compare the reconverted value of the first two cycles with the original signal and obtain an even finer digital value which is consolidated in the same manner as already described with the values obtained after the first and second cycles.

In the embodiment of FIG. 2, certain adustments are required. Thus, in the comparison between E, the original signal, and V, the digital signal, reconverted to analog form, the system is so arranged that V will always be smaller than E. In this way, the value in the fine register is always added to the value in the coarse register.

In carrying the invention into practice, it is advantageous to use the arrangement shown in FIGS. *3a, 3b*. In this arrangement, the input signal E in line 41 is fed to an analog-to-digital converter 43 and to the small signal sensor 45. From converter 43, the signal passes to counter 47 and is transferred to register 49. The digital value of register 49 is then reconverted into analog form in digital-to-analog converter 50 where this value is subtracted from the original input signal E, and the difference multiplied by a factor of $2^5$. Now, in the embodiment shown in block diagram in FIG. 2, this new value denominated as E' was then fed into a second converter 23. In the embodiment shown in FIGS. *3a, 3b,* however, the new value E' is fed to the same converter 43 as the original signal E. The digital value corresponding to E' is then fed into counter 47 and the most significant bit of counter 47 is compared with the least significant bit of register 49. If the two bits are not the same, then, the least significant bit of register 49 is reset to zero and a carry is propagated in this same register. The digital sum of register 49 and counter 47 is then transferred to register 51 where it is fed to a digital computer.

The equipment shown in FIGS. *3a, 3b* is started by some external piece of equipment, e.g., navigation equipment which will tell the present circuitry to start counting (SC.) This starts off a timer, usually in microseconds, which in turn will act on converter 43, which in the present case is a ramp converter. Ramp converter 43 will convert the input signal E to a digital value by a pulse count between zero crossings of comparator amplifier 69. The external equipment enabling the start conversion signal 53, activates timer 55 which in turn begins to count and generates a start of conversion pulse (SOC) 57. This will cause switch 59 to close which, in turn, causes Integrator 65 to start a positive-going ramp output at 67.

The analog-to-digital conversion to be performed by converter 43 will convert the analog input E into a series of pulses $P_0, P_1, P_2 \ldots P_n$, which are applied to counter 47. This conversion of analog signal E into pulses $P_0, P_1, P_2, \ldots P_n$, is accomplished by applying signal E to a comparator while a reference signal $-4V$ is applied to an integrator. Amplifier integrator 65 provides an output 67 to comparator 69 across resistors 71. The purpose of resistors 71 is to sum the output of integrator amplifier 65 to the signal input from either switch 77 or switch 79. The voltage at 67 is initially negative, and switches 77 and 79 are initially open, causing the comparator output to be positive.

As previously mentioned, the reference signal through switch 59 causes the output of amplifier 65 to generate a positive- going ramp voltage. As this voltage crosses through zero, output of comparator amplifier 69 drops to a negative level. This causes flip-flop 75 to set, which in turn, causes coarse signal switch 77, feeding signal E into comparator 69, to close. The setting of flip-flop 75 also enables pulse gate 81 to apply clock pulses into counter 47. Having thus closed switch 77 to a negative signal, while the signal 67 was at zero, causes the net sum input to the comparator to become negative. The comparator output becomes positive, but does not disturb flip-flop 75.

As the output of integrator 65 increases in the positive direction, the sum of signal 67 and negative input signal from switch 77 will grow less and less negative. When this sum becomes zero, the output of comparator amplifier 69 will change from positive to negative and cause flip-flop 75 to change state (since flip-flop 75 was set by the first crossover signal, it will now be cleared by this second crossover signal). The clearing of flip-flop 75 stops the flow of pulses into counter 47 by inhibiting pulse gate 81, causes switches 77 and 59 to open, and switch 73 to close.

With switch 73 closed, the integrator will create a negative-going ramp, at its output line 67, which tends to reset the integrator to its initial state of a small negative voltage. As soon as this small negative voltage is reached, the output of comparator amplifier 69 will become positive which opens switch 73 by means of logic gates 76 and 78.

Meanwhile, after the second crossover, the contents of counter 47 are transferred to register 49 by logic means 83 which receives a signal from the timer. Register 49, in turn, drives digital-to-analog converter 50, consisting of a ladder network resistors 85 and control switches 87. Each flip-flop in register 49, representing one bit controls a switch 87. The input signal E is fed to amplifier 89 where it is summed with the output of digital-to-analog converter network $E_b$. The difference between the input signal E and the reconverter digital signal $E_b$ is inverted and amplified by inverter 93 to provide a negative signal E′. This signal E′ is now applied to converter 43 over line 95. By this time, the cycle has started again, and timer 55 causes signal E′ to go through converter 43 in the same manner as the original input signal E, except that input switch 79 is now closed instead of switch 77. Thus signal E′ is converted into pulses $P_0, P_1, P_2, \ldots P_n$ and applied to counter 47. The least significant bit 101 of register 49 is then added to the most significant bit 103 of counter 47 by logic 105 and a carry is propagated as required, through register counter 49.

Up to this point, small signals have not been taken into account. These are sensed in small signal detectors 45. This detector receives either the original signal E or the fine signal E′, across switches 107 or 109, closed at the proper time.

The signal E or E′ is fed to a comparator amplifier 111 which compares signal E or E′ with a preset level. Comparator amplifier 111, on detecting a small signal, causes switch 117 to close simultaneously with either switches 77 or 79. The signal applied by switch 117 has the analog value equivalent of bit 103 of the register 47. At the same time, gating circuitry 115 will toggle the most significant bit 103. In effect, equal values are added and substracted simultaneously from the analog and digital side maintaining a balance. The value E or E′ increased by the most significant bit is fed to converter 43. It is then converted into digital form with the added weight being taken into consideration by the previous cancellation of most significant bit. This added circuitry avoids the problem of having two very closely spaced zero crossover detections when very small input signals were applied.

In the foregoing description, the ramp converter described is similar in construction and operation to those described in current literature, e.g., R. K. Richards "Digital Computer Components and Circuits," D. Van Nostrand Co. Inc., 1957 edition, pages 487 and 488.

It will be observed that the present invention provides for an analog-to-digital converter wherein analog signals are converted to digital values for processing in digital computers. According to the present invention concept, the analog signal is first converted into a coarse digital value. This coarse digital value is then reconverted back into analog form and subtracted from the original signal. The difference between the two signals is then amplified by a predetermined scale factor and converted into digital form to provide a fine digital value which is then combined with the coarse digital value to form an accurate output value which represents the input signal. To this end, the equipment required for these operations comprises a converter which will convert and apply the analog signal to a digital counter as a first digital count; a register to which the count in the counter can be transferred; a summing network responsive to the register, and a summing amplifier into which is fed the output of the summing network as well as the original analog signal, wherein said original input signal is compared to the output of the summing network and amplified by a predetermined scale factor, thus providing a second analog input signal; a loop feeding said second input signal to said converter to provide a second digital count in said counter; logic means to compare at least one of the most significant bits of said second digital count with at least one of the least significant bits of said first count, and a second register means whereby a consolidation of said first and second digital counts and wherefrom this consolidated output is provided to external equipment.

Furthermore, after the first two cycles, the digital-to-analog reconversion comparison and again analog conversion of the difference can be contained for a third and successive cycles to obtain more precise results with each reconversion.

While the present invention has been described in a preferred embodiment, it will be obvious to those skilled in the art that various modifications can be made therein within the scope of the invention, and it is intended that the appended claims cover all such modifications.

What is claimed is:

1. An apparatus for analog-to-digital conversion, comprising in combination, an input section; means responsive to said input section for converting an analog signal supplied by said input section into a coarse digital signal having a value substantially indicative of the absolute magnitude thereof; counter means coupled to said converter for temporarily receiving said coarse digital signal in the form of a first digital count; register means operatively associated with said counter means for storing said first digital count; means responsive to said register means for reconverting said first digital count into an analog signal representing the actual magnitude of said coarse digital value, summing amplifier means coupled to said last mentioned means and said input section for summing the original analog signal and the reconverted analog signal and for producing an output comprising the difference therebetween multiplied by a predetermined scale factor; means responsive to said amplifier means for converting said difference signal into a second digital count and for storing said second digital count in said counter means; and logic means responsive to said first digital count in said register means and said second digital count in said counter means for consolidating said first and second digital counts to provide a digital output signal accurately representative of said original analog signal.

2. An apparatus as claimed in claim 1, wherein said means for converting the original analog signal and said means for converting said difference signal are one and the same, and a feedback path is provided between said amplifying means and said means for converting the original analog signal.

3. An apparatus as claimed in claim 1, wherein means are provided responsive to said digital output signal for converting the latter into a third digital count in exactly the same manner as said second digital count, said means including logic means for consolidating said third digital count with said second and first digital counts.

4. An apparatus for converting analog signals into digital values comprising, an analog-to-digital converter including an input side and an output side for converting an analog input which is fed to said input side into a coarse digital value on said output side, said coarse digital value being related to the actual magnitude of said original analog signal, digital storage means coupled to said output side to which said coarse digital value is transferred; a digital-to-analog converter coupled to said storage means for reconverting back to an equivalent analog value the digital value in said storage means; comparison means coupled to said digital-to-analog converter for comparing said reconverted analog value with said original analog value and obtaining the difference therebetween; a feedback loop coupled to said comparison means for feeding back said difference in analog form to said analog-to-digital converter, said feedback loop including means for converting said difference into a fine digital value; switch means associated with said analog-to-digital converter input side to feed to said input side either the original analog signal or said difference signal in analog form from said feedback loop; and, logic means coupled to said analog-to-digital converter and said digital storage means for consolidating said coarse and fine digital values to provide a digital output signal accurately representative of said analog input, said apparatus further comprising a timer means, said switch means being coupled between said feedback loop and said analog-to-digital converter input side and being responsive to said timer means during a first portion of an operative cycle to feed only said original analog signal to said converter and being responsive to said timer means during a second portion of said operative cycle to feed only said difference signal to said converter.

5. An apparatus for converting analog signals into digital values comprising, an analog-to-digital converter including an input side and an output side for converting an analog input which is fed to said input side into a coarse digital value on said output side, said coarse digital value being related to the actual magnitude of said original analog signal, digital storage means coupled to said output side to which said coarse digital value is transferred; a digital-to-analog converter coupled to said storage means for reconverting back to an equivalent analog value the digital value in said storage means; comparison means coupled to said digital-to-analog converter for comparing said reconverted analog value with said original analog value and obtaining the difference therebetween; a feedback loop coupled to said comparison means for feeding back said difference in analog form to said analog-to-digital converter, said feedback lop including means for converting said difference into a fine digital value; switch means associated with said analog-to-digital converter input side to feed to said input side either the original analog signal or said difference signal in analog form from said feedback lop; and, logic means coupled to said analog-to-digital converter and said digital storage means for consolidating said coarse and fine digital values to provide a digital output signal accurately representative of said analog input, wherein said coarse digital value and said fine digital value are in the form of binary-coded words respectively, and said logic means is adapted to compare the least significant bit of said binary word corresponding to said fine digital value and to generate a carry bit if said compared bits are not in agreement whereby said binary-coded words may be added together to form a new binary-coded word having an expanded number of bits equal to the sum of the bits in said binary-coded words previous to said addition.

6. The apparatus of claim 4 wherein said analog-to-digital converter comprises an integrator coupled to a zero-crossing detector, said integrator having at its input a negative polarity reference voltage and said zero-crossing detector having one input connected to the output of said integrator and one input connected to said switch means, said timer means being operative to apply said negative polarity reference signal to said integrator whereby the output of said integrator comprises a positive going ramp, a flip-flop coupled to the output of said zero-crossing indicator, said flip-flop being operative in its set condition to apply a series of pulses to a digital counter and to actuate said switch means to apply only said original analog input signal to said zero-crossing detector input, and being operative in its reset condition to inhibit said counter and to reactuate said switch means to apply only said difference signal to said zero-crossing detector, said flip-flop being triggered to its set condition by an appropriate output signal from said zero-crossing detector caused by application of said negative reference voltage to said integrator to cause said ramp to first cross zero voltage and being triggered to its reset condition when said positive going integrator ramp output is equal to the magnitude of the original analog signal, but opposite in polarity thereto, thus causing the input to said zero-crossing detector to pass through zero a second time, whereby the number of pulses applied to said digital counter between said first and second crossings of zero voltage at the input of said zero-crossing detector is an approximation of the magnitude of said original analog signal.

7. The apparatus of claim 6 wherein said timer means is adapted to initiate transfer of said count in said digital counter to said digital storage means in response to said second zero-crossover.

8. An apparatus for converting analog signals into digital values comprising, an analog-to-digital converter including an input side and an output side for converting an analog input which is fed to said input side into a coarse digital value on said output side, said coarse digital value being related to the actual magnitude of said original analog signal, digital storage means coupled to said output side to which said coarse digital value is transferred; a digital-to-analog converter coupled to said storage means for reconverting back to an equivalent analog value the digital value in said storage means; comparison means coupled to said digital-to-analog converter for comparing said reconverted analog value with said original analog value and obtaining the difference therebetween; a feedback loop coupled to said comparison means for feeding back said difference in analog form to said analog-to-digital converter, said feedback loop including means for converting said difference into a fine digital value; switch means associated with said analog-to-digital converter input side to feed to said input side either the original analog signal or said difference signal in analog form from said feedback loop; and, logic means coupled to said analog-to-digital converter and said digital storage means for consolidating said coarse and fine digital values to provide a digital output signal accurately representative of said analog input, said apparatus further including a small signal detector having an amplifier and a logic network, said amplifier being coupled to the input side of said analog-to-digital converter and feeding an output to the logic network, said logic network being coupled to a counter section in said digital storage means, whereby a signal falling below a predetermined level will be amplified by a value corresponding to said counter section and said counter section value will be cancelled.

References Cited

UNITED STATES PATENTS

| | | | |
|---|---|---|---|
| 2,832,827 | 4/1958 | Metzger | 340—347 X |
| 2,969,535 | 1/1961 | Foulkes | 340—347 |
| 2,974,315 | 3/1961 | Lebel et al. | 340—347 |
| 3,188,624 | 6/1965 | McMillan | 340—347 |
| 3,259,896 | 7/1966 | Pan | 340—347 |

MAYNARD D. WILBUR, Primary Examiner

G. R. EDWARDS, Assistant Examiner